US011653381B2

(12) United States Patent
Yi et al.

(10) Patent No.: US 11,653,381 B2
(45) Date of Patent: *May 16, 2023

(54) UPLINK TRANSMISSION BASED ON UL-GRANT ASSOCIATED WITH SPECIFIC LOGICAL CHANNEL PRIORITY

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

This patent is subject to a terminal disclaimer.

(21) Appl. No.: 17/217,303

(22) Filed: Mar. 30, 2021

(65) Prior Publication Data

US 2021/0219310 A1 Jul. 15, 2021

Related U.S. Application Data

(63) Continuation of application No. 16/336,461, filed as application No. PCT/KR2017/010722 on Sep. 27, 2017, now Pat. No. 10,986,650.

(60) Provisional application No. 62/401,179, filed on Sep. 29, 2016, provisional application No. 62/401,180, filed on Sep. 29, 2016.

(51) Int. Cl.
*H04W 72/12* (2009.01)
*H04W 72/14* (2009.01)
*H04W 72/1268* (2023.01)

(52) U.S. Cl.
CPC ............ *H04W 72/1242* (2013.01); *H04W 72/1268* (2013.01); *H04W 72/14* (2013.01)

(58) Field of Classification Search
CPC ............ H04W 72/1242; H04W 72/14; H04W 72/1268
See application file for complete search history.

(56) References Cited

U.S. PATENT DOCUMENTS

| 8,165,152 B2 | 4/2012 | Sammour et al. |
| 8,488,540 B2 | 7/2013 | Yi et al. |
| 8,774,114 B2 | 7/2014 | Sammour et al. |

(Continued)

FOREIGN PATENT DOCUMENTS

| CN | 102123512 | 7/2011 |
| CN | 104813723 | 7/2015 |

(Continued)

OTHER PUBLICATIONS

United States Patent and Trademark Office U.S. Appl. No. 16/336,461, Notice of Allowance dated Dec. 17, 2020, 9 pages.

(Continued)

*Primary Examiner* — Rasheed Gidado
(74) *Attorney, Agent, or Firm* — Lee, Hong, Degerman, Kang & Waimey PC

(57) ABSTRACT

Method and apparatus for a user equipment (UE) transmitting uplink signals in a wireless communication system are disclosed. For this end, the UE, receiving first uplink grant information and logical channel priority information associated with the first uplink grant, constructs a first data unit including data from one or more radio bearers with first logical channel priority corresponding to the logical channel priority information. And, the UE transmits the first data unit to a network.

18 Claims, 7 Drawing Sheets

(56) References Cited

U.S. PATENT DOCUMENTS

| | | | |
|---|---|---|---|
| 10,314,072 | B2 | 6/2019 | Loehr et al. |
| 10,405,327 | B2 | 9/2019 | Loehr et al. |
| 2009/0316637 | A1* | 12/2009 | Yi .................... H04W 72/0413 370/329 |
| 2009/0323842 | A1 | 12/2009 | Zhang et al. |
| 2011/0038335 | A1 | 2/2011 | Kim et al. |
| 2011/0039568 | A1* | 2/2011 | Zhang ................ H04W 74/002 455/452.1 |
| 2011/0170495 | A1* | 7/2011 | Earnshaw ............ H04L 5/0091 370/329 |
| 2011/0267959 | A1 | 11/2011 | Yi et al. |
| 2014/0023010 | A1* | 1/2014 | Loehr ................. H04W 52/365 370/329 |
| 2014/0133410 | A1* | 5/2014 | Nguyen ............ H04W 72/1242 370/329 |
| 2015/0201426 | A1 | 7/2015 | Yi et al. |
| 2015/0271809 | A1 | 9/2015 | Kato et al. |
| 2016/0037510 | A1 | 2/2016 | Park et al. |
| 2016/0205542 | A1 | 7/2016 | Yavuz et al. |
| 2019/0239242 | A1 | 8/2019 | Yi et al. |

FOREIGN PATENT DOCUMENTS

| | | |
|---|---|---|
| EP | 2343946 | 7/2011 |
| JP | 2015-039230 | 2/2015 |
| JP | 2015039230 | 2/2015 |
| JP | 2017-514347 | 6/2017 |
| KR | 101630909 | 6/2016 |
| WO | 2015139862 | 9/2015 |

OTHER PUBLICATIONS

United States Patent and Trademark Office U.S. Appl. No. 16/336,461, Office Action dated Jul. 7, 2020, 12 pages.

European Patent Office Application Serial No. 17856733.5, Search Report dated Apr. 3, 2020, 11 pages.

Qualcomm, "TFC Selection", 3GPP TSG RAN WG2 Meeting #54, R2-062385, XP050131976, Sep. 2006, 4 pages.

Lucent, "Improved QoS handling for UL scheduling", 3GPP TSG RAN WG2 Meeting #54, R2-062226, XP050131834, Sep. 2006, 4 pages.

LG Electronics, "QoS framework in 5G New Rat", 3GPP TSG RAN WG2 Meeting #93bis, R2-162898, XP051082628, Apr. 2016, 4 pages.

Japan Patent Office Application No. 2019-517055, Office Action dated Feb. 4, 2020, 6 pages.

Samsung, "Logical Channel Prioritization Considering Multiple Numerologies and/or TTIs", 3GPP TSG RAN WG2 Meeting #96, R2-168040, Nov. 2016, 5 pages.

Ericsson, "Introduction of L2 latency reduction techniques", 3GPP TSG RAN WG2 Meeting #95, R2-165767, Aug. 2016, 12 pages.

PCT International Application No. PCT/KR2017/010722, Notification of Transmittal of the International Search Report and the Written Opinion of the International Searching Authority, or Declaration dated Jan. 15, 2018, 14 pages.

State Intellectual Property Office of the People's Republic of China Application Serial No. 201780059973.4, Office Action dated Oct. 8, 2021, 9 pages.

* cited by examiner (a) Control-Plane Protocol Stack (b) User-Plane Protocol Stack

UPLINK TRANSMISSION BASED ON UL-GRANT ASSOCIATED WITH SPECIFIC LOGICAL CHANNEL PRIORITY

CROSS-REFERENCE TO RELATED APPLICATIONS

This application is a continuation of U.S. patent application Ser. No. 16/336,461, filed on Mar. 25, 2019, which is the National Stage filing under 35 U.S.C. 371 of International Application No. PCT/KR2017/010722, filed on Sep. 27, 2017, which claims the benefit of U.S. Provisional Application No. 62/401,179, filed on Sep. 29, 2016, and 62/401,180, filed on Sep. 29, 2016, the contents of which are all hereby incorporated by reference herein in their entirety.

TECHNICAL FIELD

The present invention relates to uplink signals transmission in a wireless communication system. More specifically, the present invention related to methods and apparatus for transmitting uplink signals based on UL-grant associated with specific logical channel priority.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a block diagram illustrating network structure of an evolved universal mobile telecommunication system (E-UMTS). The E-UMTS may be also referred to as an LTE system.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB or eNB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device. eNode B 20 may be referred to as eNB, eNB etc. However, in the following explanation, the term 'UE' and 'eNodeB' are used for convenience.

FIG. 2 is a block diagram depicting architecture of a typical E-UTRAN and a typical EPC.

As illustrated in FIG. 2, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated in FIG. 2, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce un-necessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 shows uplink transmission by a UE in LTE system.

In LTE, when the UE wants to transmit data in uplink, it first requests UL grant by transmitting buffer status report (BSR) to the eNB (S410). Based on the buffer status report from the UE, the eNB allocates UL grant to the UE via PDCCH signaling (S420). The PDCCH includes various Downlink Control Information (DCI) using various formats, and, among them, DCI format 0 is used to allocate an UL grant to the UE.

Disclosure of Invention Technical Problem

The problem in the prior art is that an UL grant is allocated for all RBs of a UE, and it cannot be guaranteed that the UE uses the received UL grant for RBs with a specific logical channel priority. For fine control of RB scheduling, a mechanism to use UL grant only for RBs with a specific logical channel priority needs to be considered.

Solution to Problem

To achieve these objects and other advantages and in accordance with the purpose of the invention, as embodied and broadly described herein, a method for a user equipment (UE) transmitting uplink signals in a wireless communication system, the method comprising: receiving first uplink grant information and logical channel priority information associated with the first uplink grant; constructing a first data unit including data from one or more radio bearers with first logical channel priority corresponding to the logical channel priority information; and transmitting the first data unit to a network, is provided.

The first data unit may further include data from a radio bearer with next higher logical channel priority than the first logical channel priority, if there is remaining space in the first data unit after including the data from one or more radio bearers with first logical channel priority.

Alternatively, the first data unit may further comprise padding, if there is remaining space in the first data unit after including the data from one or more radio bearers with first logical channel priority.

The logical channel priority information may be received through a PDCCH (Physical Downlink Control Channel).

Alternatively, the logical channel priority information may be received in a format of a MAC (Medium Access Control) CE (Control Element) through a PDSCH (Physical Downlink Shared Channel).

Here, receiving the first uplink grant information may comprise: receiving multiple logical channel priority informations respectively associated with multiple uplink grants.

Alternatively, receiving the first uplink grant information may comprise: receiving multiple logical channel priority informations associated with the first uplink grant.

In another aspect of the present invention, a user equipment (UE) for transmitting uplink signals in a wireless communication system, the method comprising: a transceiver configured to receive first uplink grant information and logical channel priority information associated with the first uplink grant; and a processor configured to construct a first data unit including data from one or more radio bearers with first logical channel priority corresponding to the logical channel priority information, is provided.

The processor may further include data from a radio bearer with next higher logical channel priority than the first logical channel priority within the first data unit, if there is remaining space in the first data unit after including the data from one or more radio bearers with first logical channel priority.

Alternatively, the processor may further include padding within the first data unit, if there is remaining space in the first data unit after including the data from one or more radio bearers with first logical channel priority.

The transceiver may receive the logical channel priority information through a PDCCH (Physical Downlink Control Channel).

Alternatively, the transceiver may receive the logical channel priority information in a format of a MAC (Medium Access Control) CE (Control Element) through a PDSCH (Physical Downlink Shared Channel).

The transceiver may be configured to receive multiple logical channel priority informations respectively associated with multiple uplink grants.

Or, the transceiver may be configured to receive multiple logical channel priority informations associated with the first uplink grant.

Advantageous Effects of Invention

According to the present invention, fine control of RB scheduling is possible by a mechanism to use UL grant only for RBs with a specific logical channel priority.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the invention.

As described before, according to LTE, the UL grant is allocated for all RBs of a UE, and it cannot be guaranteed that the UE uses the received UL grant for RBs with a specific logical channel priority.

Figure 1:
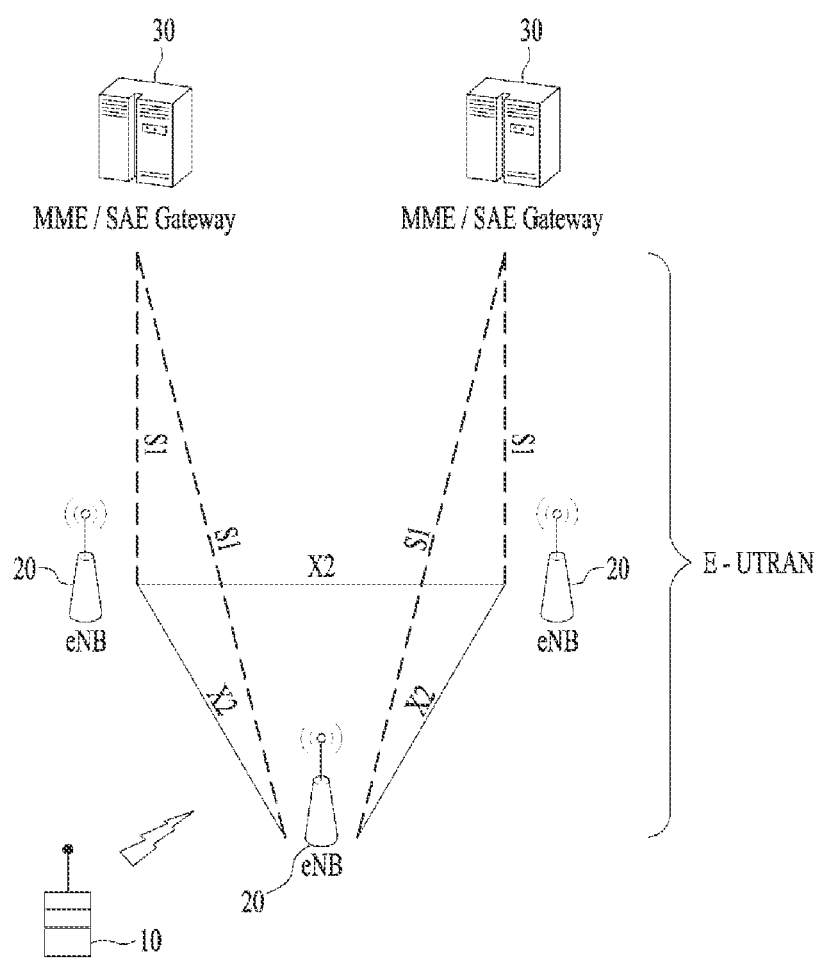
FIG. 1 is a block diagram illustrating network structure of an evolved universal mobile telecommunication system (E-UMTS)
Figure 2:
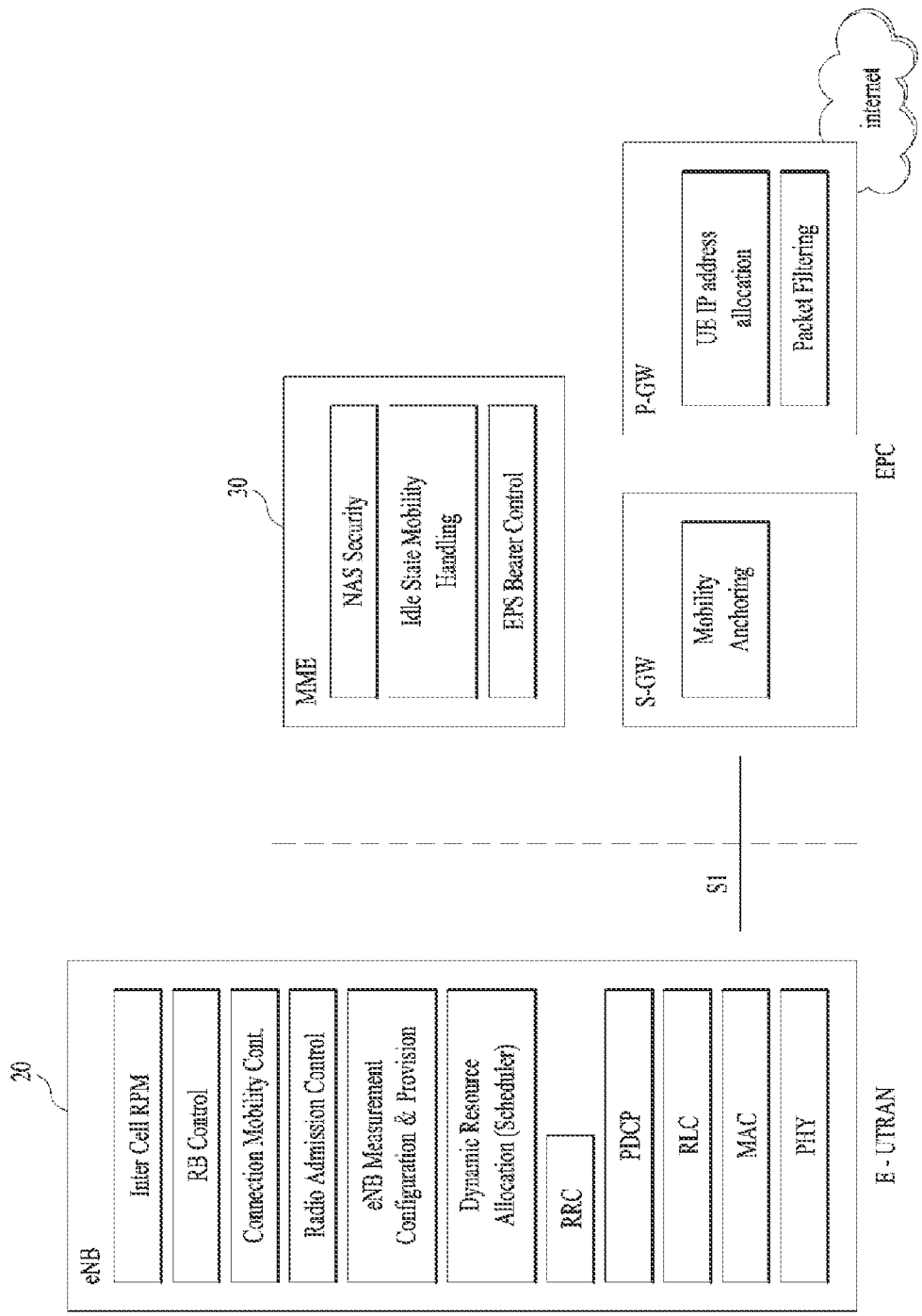
FIG. 2 is a block diagram depicting architecture of a typical E-UTRAN and a typical EPC.
Figure 3:
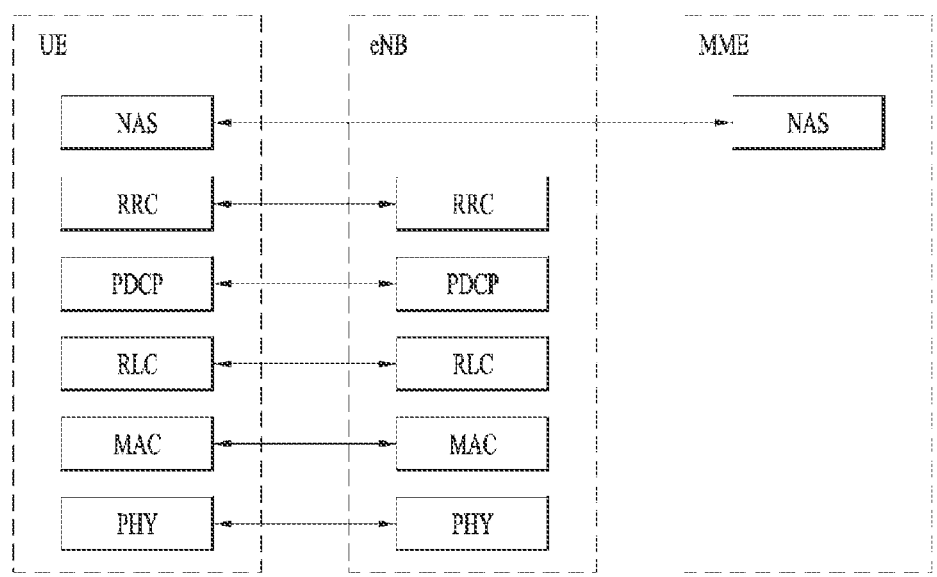
FIG. 3 is a diagram showing a control plane and a user plane of a radio interface protocol between a UE and an E-UTRAN based on a 3GPP radio access network standard.
Figure 3:
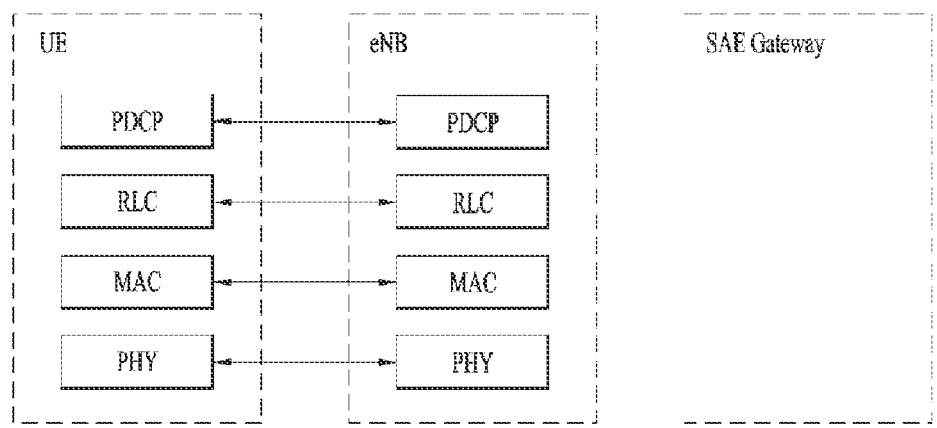
Figure 4:
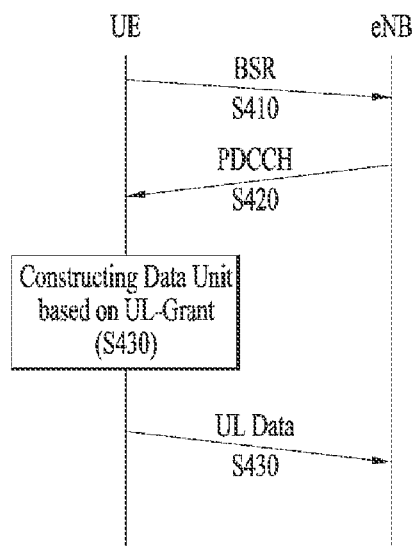
FIG. 4 shows uplink transmission by a UE in LTE system.
Figure 5:
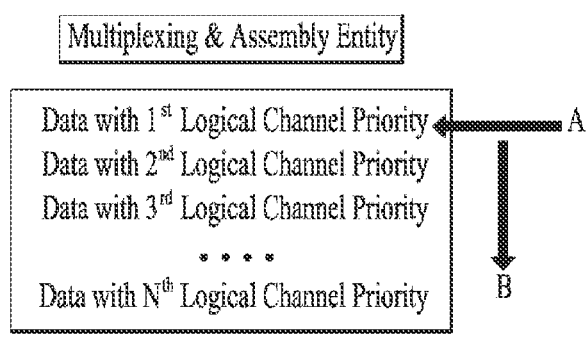
FIG. 5 is a diagram for explaining the resource allocation according to LTE.

FIG. 5 is a diagram for explaining the resource allocation according to LTE.

When UE wants to transmit uplink signals, the MAC of the UE may construct data unit (e.g. MAC PDU) based on the operation of Multiplexing and Assembly entity within the MAC. As shown in FIG. 5, the MAC of UE according to LTE constructs the data unit from data with the highest logical channel priority (e.g. $1^{st}$ logical channel priority) (A).

When there is a remaining resource within the data unit after including the highest logical channel priority, the MAC of UE may further include data with next highest logical channel priority in descending order (B).

Specific operation of MAC of the UE is as following. Following is the operation of Multiplexing and assembly entity with regards to logical channel prioritization.

The Logical Channel Prioritization procedure is applied when a new transmission is performed. RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD).

The MAC entity shall maintain a variable $B_j$ for each logical channel j. $B_j$ shall be initialized to zero when the related logical channel is established, and incremented by the product PBR*TTI duration for each TTI, where PBR is Prioritized Bit Rate of logical channel j. However, the value of $B_j$ can never exceed the bucket size and if the value of $B_j$ is larger than the bucket size of logical channel j, it shall be set to the bucket size. The bucket size of a logical channel is equal to PBR*BSD, where PBR and BSD are configured by upper layers.

The MAC entity shall perform the following Logical Channel Prioritization procedure when a new transmission is performed:

The MAC entity shall allocate resources to the logical channels in the following steps:

Step 1: All the logical channels with $B_j$>0 are allocated resources in a decreasing priority order. If the PBR of a logical channel is set to "infinity", the MAC entity shall allocate resources for all the data that is available for transmission on the logical channel before meeting the PBR of the lower priority logical channel(s);

Step 2: the MAC entity shall decrement $B_j$ by the total size of MAC SDUs served to logical channel j in Step 1.

Note that the value of $B_j$ can be negative.

Step 3: if any resources remain, all the logical channels are served in a strict decreasing priority order (regardless of the value of $B_j$) until either the data for that logical channel or the UL grant is exhausted, whichever comes first. Logical channels configured with equal priority should be served equally.

The UE shall also follow the rules below during the scheduling procedures above:

the UE should not segment an RLC SDU (or partially transmitted SDU or retransmitted RLC PDU) if the whole SDU (or partially transmitted SDU or re-transmitted RLC PDU) fits into the remaining resources of the associated MAC entity;

if the UE segments an RLC SDU from the logical channel, it shall maximize the size of the segment to fill the grant of the associated MAC entity as much as possible;

the UE should maximize the transmission of data.

if the MAC entity is given an UL grant size that is equal to or larger than 4 bytes while having data available for transmission, the MAC entity shall not transmit only padding BSR and/or padding (unless the UL grant size is less than 7 bytes and an AMD PDU segment needs to be transmitted).

The MAC entity shall not transmit data for a logical channel corresponding to a radio bearer that is suspended.

For the Logical Channel Prioritization procedure, the MAC entity shall take into account the following relative priority in decreasing order:

MAC control element for C-RNTI or data from UL-CCCH;

MAC control element for BSR, with exception of BSR included for padding;

MAC control element for PHR, Extended PHR, or Dual Connectivity PHR;

MAC control element for Sidelink BSR, with exception of Sidelink BSR included for padding;

data from any Logical Channel, except data from UL-CCCH;

MAC control element for BSR included for padding;

MAC control element for Sidelink BSR included for padding.

Notes that, when the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed.

In order for UE to use UL grant for RBs with a specific logical channel priority, it is proposed that when the eNB allocates an UL grant to a UE, the eNB can also indicate the specific logical channel priority that can use the UL grant. When the UE receives an UL grant and the specific logical channel priority indication, the UE can construct a PDU including only data from the RBs with the indicated priority, and transmits the PDU to the eNB using the UL grant.

Figure 6:
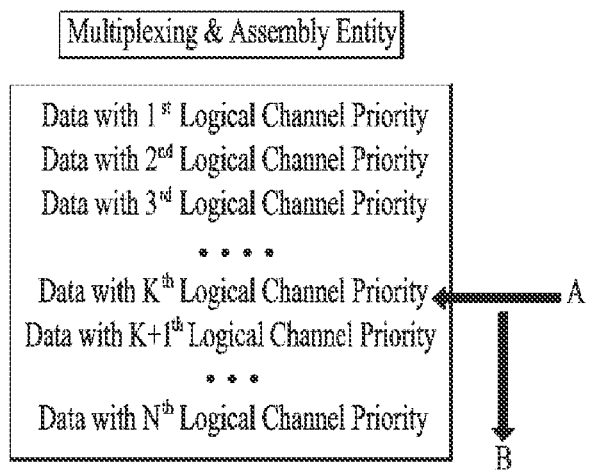
FIG. 6 shows a concept of UL-grant with specific logical channel priority information.

FIG. 6 shows a concept of UL-grant with specific logical channel priority information.

As shown in FIG. 6, when the UL-grant is received together with specific logical channel priority information, the UE may construct PDU from data from one or more RBs with $k^{th}$ logical channel priority corresponding to the received logical channel priority information (A).

If the UE receives an UL grant without logical channel priority information, the UE may construct a PDU including only data from the RBs with the highest QoS, and transmits the PDU to the eNB using the UL grant.

If there is remaining space in UL grant after including data from RBs with indicated priority, the UE can fill the remaining space with data from RBs with next lower priority as shown in FIG. 6 with reference character B. But, the UE can fill the remaining space with one of the followings:

Padding

Data from RBs with next higher priority

Data from RBs with next lower priority

In this embodiment, the UL-Grant can be received with logical channel priority information. But, UL-grant can be received with QoS Class Identifier, RB priority etc. The other type of information can do corresponding roll as the logical channel priority information above.

When an RB is configured, the UE receives logical channel priority indication of corresponding RB from the eNB.

It is possible that multiple UL grants, one for each priority information, can be allocated to the UE by one UL grant allocation signaling. When the UE receives at least one set of UL grant and priority indication, the UE constructs multiple PDUs, one PDU for each priority indication, and transmits them using the respective UL grants.

For the signaling of UL grant and priority indication, there can be two embodiments. The two embodiments may be used at the same, e.g. embodiment 1 is used for only one logical channel priority and embodiment 2 is used for multiple logical channel priority.

Embodiment 1: PDCCH Includes UL Grant and Logical Channel Priority Indication (Allocation by PHY Signaling)

In the LTE, UL grant is already included in the DCI format 0 (i.e. resource block assignment and hopping resource allocation).

For this embodiment, priority indication is also included in the DCI format 0. The length of the priority indication field is preferred to be able to indicate the maximum number of logical channel priorities that one UE supports. In LTE, the maximum number of logical channel priorities is 8, and the priority indication field should be 3 bits in this case.

To allocate multiple UL grants via one PDCCH signaling, multiple sets of UL grant and priority indication are included in the PDCCH. The DCI format 0 can be extended to include multiple sets.

Embodiment 2: PDCCH Indicates PDSCH, and PDSCH Includes UL Grant and Logical Channel Priority Indication (Allocation by MAC Signaling)

As the number of available bits in PDCCH is limited, multiple sets of UL grant and priority indication may not be included in one PDCCH. Thus, in this embodiment, the PDCCH indicates PDSCH, and the downlink MAC PDU transmitted on the PDSCH includes multiple sets of UL grant and priority indication. It is possible that only one set of UL grant and priority indication is included in the PDSCH.

The existing DCI formats 1, 2, 3, 4, 5, 6 can be used for this indication as they are, but a special indication may be added in those DCI formats to indicate that the corresponding PDSCH includes UL grant and priority indication. It is possible that a new DCI format can be introduced to indicate that PDSCH includes UL grant and priority indication.

In the PDSCH, the set of UL grant and priority indication can be defined as a MAC Control Element, called UL grant MAC CE. An LCID can be allocated for the UL grant MAC CE. One UL grant MAC CE may include one set of UL grant and priority indication. It is possible that one UL grant MAC CE includes multiple sets of UL grant and priority indication.

Improvement of BSR

In another aspect of the present invention, BSR transmission is considered.

In LTE, the UE buffer status is reported via BSR MAC CE where the buffer status is reported per Logical Channel Group (LCG). Each LCG has at least one Logical Channels (LoCH), and each LoCH belongs to only one LCG.

The problem in the LTE is that with the BSR MAC CE, the eNB does not know the exact amount of data in one logical channel, because the buffer status is reported per LCG not per LoCH.

On the other hand, if the buffer status is reported per LoCH in one BSR MAC CE, the size of BSR MAC CE would be significantly increased, because one LoCH BSR requires 2 bytes (i.e. 5 bits LoCH ID and 6 bits BS).

From the overall system point of view, what is important for the eNB to know is what amount of data with higher QoS is waiting for transmission in the UE side.

Therefore, it would be efficient a mechanism to report buffer status of specific QoS is further considered.

In order for UE to report buffer status per QoS (say QoS BSR), it is proposed that the UE calculates a Buffer Size (BS) of a QoS, say QoS_BS, by summing up all the amount of data available for transmission in RBs with the corresponding QoS, and reports the QoS_BS together with the QoS ID.

The QoS ID can be represented as various ways, e.g. QoS Class Identifier (QCI), logical channel priority, RB priority, etc. When an RB is configured, the UE receives QoS ID of corresponding RB from the eNB.

The UE considers RBs with the same QoS ID as one group, say QoS group, and calculates and reports the amount of data per QoS group.

The UE may trigger QoS BSR in at least one of following cases:
When a first data arrives at the QoS group. In other words, a new data arrives at the empty buffer of the QoS group.
When a first data arrives at one of the RBs belonging to the QoS group. In other words, a new data arrives at the empty buffer of a RB belonging to the QoS group.

When a QoS BSR is triggered, the UE may calculate for each QoS the amount of data available for transmission of RBs belonging to the corresponding QoS. This is called QoS_BS.

After calculating QoS_BS for all QoS groups, the UE may construct a QoS BSR by including QoS ID and QoS_BS for each QoS. In the QoS BSR, the UE includes set of QoS ID and QoS_BS in decreasing order of QoS.

If the QoS BSR is truncated due to the lack of space in UL grant, the UE may include set of QoS ID and QoS_BS only up to a set that can fit to the remaining space in UL grant. After constructing QoS BSR, the UE may transmit it to the eNB.

Figure 7:
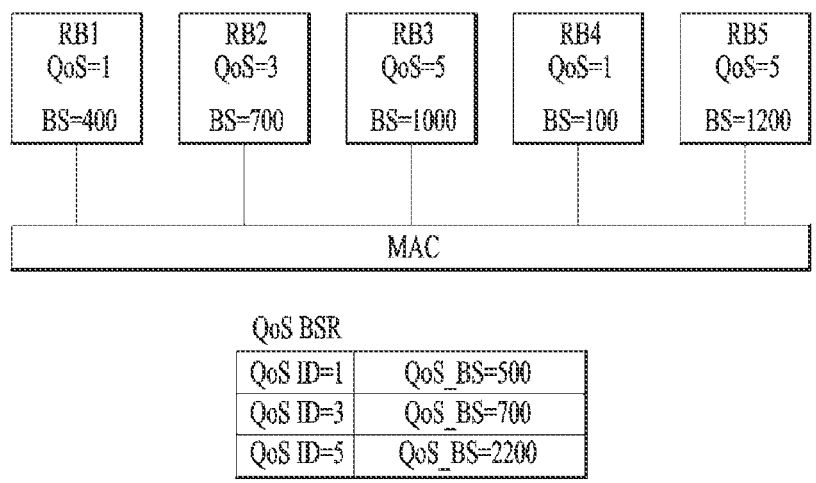
FIG. 7 shows an example of QoS BSR.

FIG. 7 shows an example of QoS BSR.

The UE can be configured with 5 RBs, together with corresponding QoS ID. The lower value of QoS ID means higher QoS.

When a QoS BSR is triggered, the UE calculates QoS_BS per QoS.

After calculating QoS_BS for each QoS, the UE constructs QoS BSR in the decreasing order of QoS by including QoS ID and corresponding QoS_BS.

Apparatus for the Above Methods

Figure 8:
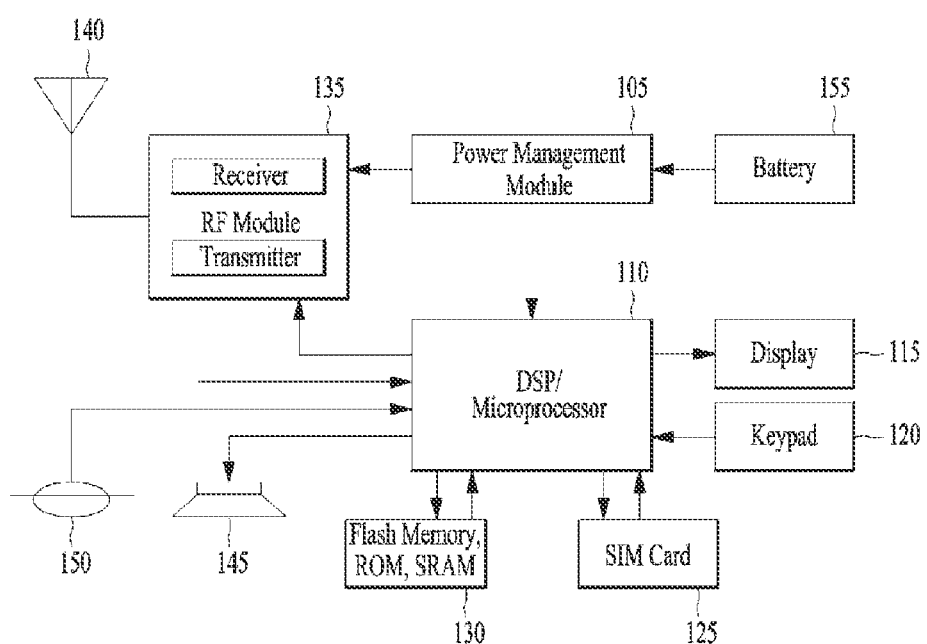
FIG. 8 is a block diagram of a communication apparatus according to an embodiment of the present invention.

FIG. 8 is a block diagram of a communication apparatus according to an embodiment of the present invention.

The apparatus shown in FIG. 8 can be a user equipment (UE) and/or eNB adapted to perform the above mechanism, but it can be any apparatus for performing the same operation.

As shown in FIG. 8, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 8 may represent a UE comprising a receiver (135) configured to receive signal from the network, and a transmitter (135) configured to transmit signals to the network. These receiver and the transmitter can constitute the transceiver (135). The UE further comprises a processor (110) connected to the transceiver (135: receiver and transmitter).

Also, FIG. 8 may represent a network apparatus comprising a transmitter (135) configured to transmit signals to a UE and a receiver (135) configured to receive signal from the UE. These transmitter and receiver may constitute the transceiver (135). The network further comprises a processor (110) connected to the transmitter and the receiver.

Figure 9:
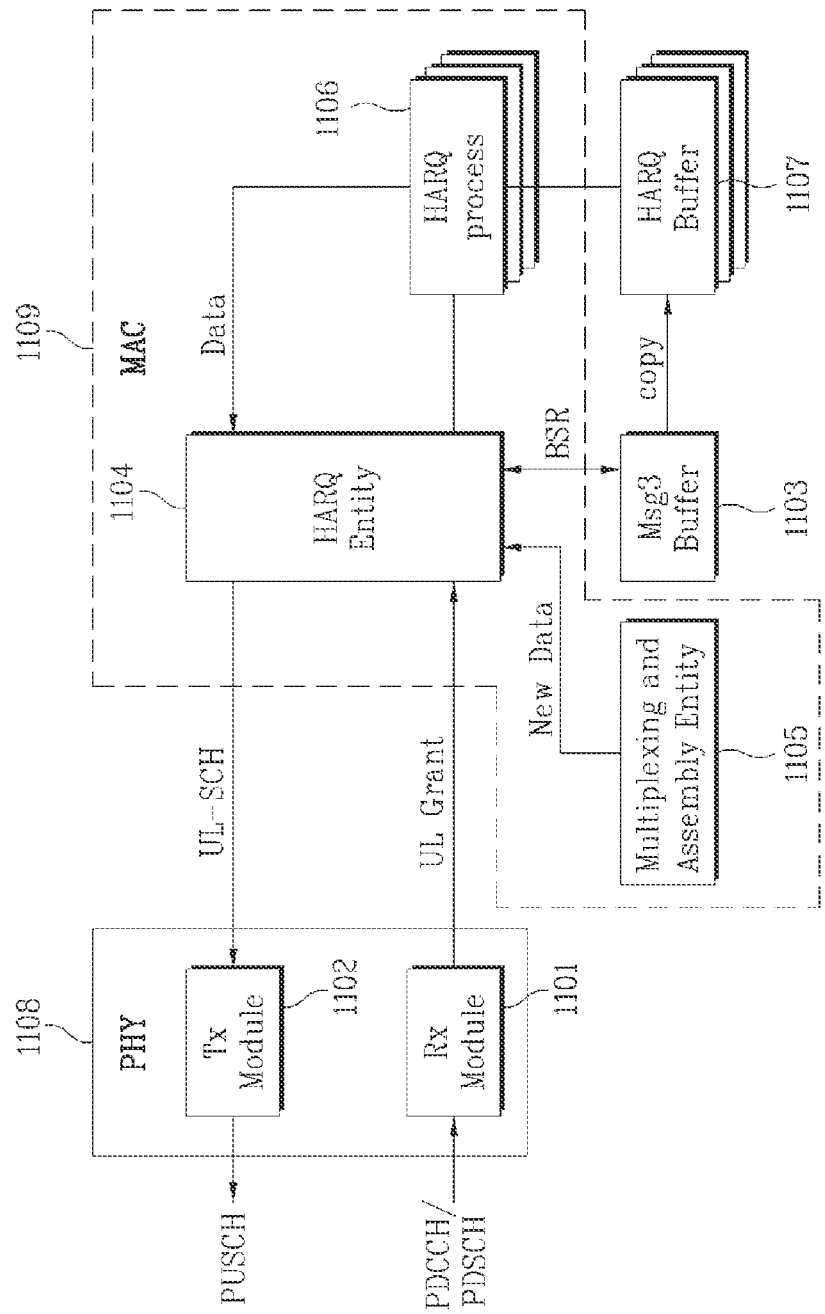
FIG. 9 is a schematic view showing the configuration of a UE according to an embodiment of the present invention.

FIG. 9 is a schematic view showing the configuration of a UE according to an embodiment of the present invention.

As shown in FIG. 9, the UE according to the present embodiment may include a reception (Rx) module 1101 for receiving a UL Grant signal from an eNode B on a specific message, a transmission (TX) module 1102 for transmitting data to the eNode B using the received UL Grant signal, a Msg3 buffer 1103 for storing UL data transmitted in a random access procedure, and a HARQ entity 1104 for controlling the transmission of UL data of the UE.

In particular, multiplexing and assembly entity 1105 can perform the above explained construction of data unit based on the UL-Grant with logical channel priority information.

Meanwhile, the HARQ entity 1104 according to the present embodiment may transfer the data acquired from the multiplexing and assembly entity 1105 or the msg3 buffer 1103 to a specific HARQ process 1106, and control the specific HARQ process 1106 to transmit the data acquired from the multiplexing and assembly entity 1105 or the Msg3 buffer 1103 through the Tx module 1102.

In the configuration of the UE shown in FIG. 9, the Tx module 1102 and the Rx module 1101 may be configured as a physical layer processing module 1108, and the HARQ entity 1104, the multiplexing and assembly entity 1105 and one or more HARQ processes 1106 may be configured as a MAC layer module 1109. However, the invention is not limited thereto. In addition, the Msg3 buffer 1103 and the HARQ buffers 1107 corresponding to the HARQ processes 1106 may be implemented using any storage medium.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', 'gNB', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP system, the present invention is applicable to a variety of wireless communication systems, e.g. IEEE system, in addition to the 3GPP system.

What is claimed is:

1. A method for a user equipment (UE) transmitting an uplink signal in a wireless communication system, the method comprising:
receiving a physical downlink control channel (PDCCH) including uplink grant; and
transmitting uplink data based on the uplink grant,
wherein, based on a priority indicator not being provided by the PDCCH, the uplink data is data from one or more logical channels selected based on a lowest value among values which can be allocated as the priority indicator.

2. The method of claim 1, wherein, based on the priority indicator being provided by the PDCCH, the uplink data is data from one or more logical channels selected based on the priority indicator.

3. The method of claim 1, wherein, based on remaining space in a protocol data unit (PDU) including the data from the one or more logical channels selected based on the lowest value among the values which can be allocated as the priority indicator, the uplink data is transmitted with padding.

4. The method of claim 1, wherein the lowest value represents a highest quality of service (QoS).

5. The method of claim 1, the data from the one or more logical channels includes data from one or more radio bearers corresponding to the one or more logical channels.

6. The method of claim 1, wherein the priority indicator is allocated by a physical layer signaling.

7. A user equipment (UE) for transmitting an uplink signal in a wireless communication system, the UE comprising:
a transceiver; and
a processor configured to:
control the transceiver to receive a physical downlink control channel (PDCCH) including uplink grant;
control the transceiver to transmit uplink data based on the uplink grant,
wherein, based on a priority indicator not being provided by the PDCCH, the uplink data is data from one or more logical channels selected based on a lowest value among values which can be allocated as the priority indicator.

8. The UE of claim 7, wherein, based on the priority indicator being provided by the PDCCH, the uplink data is data from one or more logical channels selected based on the priority indicator.

9. The UE of claim 7, wherein, based on remaining space in a protocol data unit (PDU) including the data from the logical channel with the lowest value among the values which can be allocated as the priority indicator, the uplink data is transmitted with padding.

10. The UE of claim 7, wherein the lowest value represent a highest quality of service (QoS).

11. The UE of claim 7, the data from the logical channel includes data from the radio bearer corresponding to the logical channel.

12. The UE of claim 7, wherein the priority indicator is allocated by a physical layer signaling.

13. A method for a base station (BS) for receiving an uplink signal in a wireless communication system, the method comprising:
transmitting a physical downlink control channel (PDCCH) including uplink grant; and
receiving uplink data based on the uplink grant,
wherein, based on a priority indicator not being provided by the PDCCH, the uplink data is data from one or more logical channels selected based on a lowest value among values which can be allocated as the priority indicator.

14. The method of claim 13, wherein, based on the priority indicator being provided by the PDCCH, the uplink data is data from one or more logical channels selected based on the priority indicator.

15. The method of claim 13, wherein, based on remaining space in a protocol data unit (PDU) including the data from one or more logical channels selected based on the lowest value among the values which can be allocated as the priority indicator, the uplink data is transmitted with padding.

16. The method of claim 13, wherein the lowest value represents a highest quality of service (QoS).

17. The method of claim 13, the data from the one or more logical channels includes data from one or more radio bearers corresponding to one or more logical channels.

18. The method of claim 13, wherein the priority indicator is allocated by a physical layer signaling.

* * * * *